United States Patent
Bala et al.

(10) Patent No.: US 7,295,703 B2
(45) Date of Patent: Nov. 13, 2007

(54) METHOD FOR SCANNER CHARACTERIZATION FOR COLOR MEASUREMENT OF PRINTED MEDIA HAVING FOUR OR MORE COLORANTS

(75) Inventors: Raja Bala, Webster, NY (US); Judith Stinehour, Rochester, NY (US); Gaurav Sharma, Webster, NY (US)

(73) Assignee: Xerox Corporation, Stamford, CT (US)

( * ) Notice: Subject to any disclaimer, the term of this patent is extended or adjusted under 35 U.S.C. 154(b) by 747 days.

(21) Appl. No.: 10/871,114

(22) Filed: Jun. 18, 2004

(65) Prior Publication Data
US 2005/0281459 A1 Dec. 22, 2005

(51) Int. Cl.
G06K 9/00 (2006.01)
G06K 1/00 (2006.01)
H04N 1/46 (2006.01)

(52) U.S. Cl. ........................ 382/165; 358/1.9
(58) Field of Classification Search ............... 382/162, 382/165, 167; 358/1.12, 1.13, 1.18, 1.5, 358/1.9, 3.23, 504, 518, 520, 523, 525; 345/600–604
See application file for complete search history.

(56) References Cited

U.S. PATENT DOCUMENTS

| | | | |
|---|---|---|---|
| 5,734,800 A * | 3/1998 | Herbert et al. | 358/1.9 |
| 5,760,913 A * | 6/1998 | Falk | 382/167 |
| 6,275,600 B1 | 8/2001 | Banker et al. | |
| 6,335,800 B1 * | 1/2002 | Balasubramanian | 358/1.9 |
| 6,522,430 B1 | 2/2003 | Dalal et al. | |
| 6,529,616 B1 | 3/2003 | Rasmussen et al. | |
| 6,646,763 B1 * | 11/2003 | Estrada | 358/1.9 |
| 6,647,140 B1 | 11/2003 | Wang et al. | |
| 6,870,636 B2 * | 3/2005 | Kulkarni | 358/1.9 |
| 6,972,867 B1 * | 12/2005 | Venable et al. | 358/1.9 |
| 7,085,004 B2 * | 8/2006 | Sharma et al. | 358/1.9 |
| 7,116,452 B2 * | 10/2006 | Han et al. | 358/530 |
| 2004/0151371 A1 * | 8/2004 | Chen et al. | 382/165 |

OTHER PUBLICATIONS

R. Balasubramanian, M.S. Maltz; Refinement of printer transformations using weighted regression, Proc, SPIE, vol. 2658, pp. 334-340 (1996).

G. Sharma, S. Wang, D. Sidavanahali, and K.T. Knox, "The impact of UCR on scanner calibration," in Final Prog. And Proc. IS&T's PICS Conference, Portland, OR, May 17-20, 1998.

G. Sharma and S. Wang, Spectrum Recovery from ColorimetricData for Color Reproductions, in Proc.SPIE 4664 IS&T/SPIE's Electronic Imaging Symposium, Jan. 20-25, 2002, San Jose, C.

R. Bala, "Device Characterization," Chapter 5 of Digital Color Imaging Handbook, CRC Press, 2003.

* cited by examiner

Primary Examiner—Amir Alavi
(74) Attorney, Agent, or Firm—Duane C. Basch; Basch & Nickerson, LLP

(57) ABSTRACT

The present invention is directed to a method and apparatus for the improved characterization of an image scanner or similar image input terminal so as to enable the device to be employed in the measurement and analysis of color images. The invention uses a family of input device characterization targets, each varying in primary colorants and at a fixed level of black (K) colorant. A corresponding family of input device characterizations is derived, one for each level of K, and the final transformation is prepared such that the characterization includes K as an additional input—thereby improving the characterization and accuracy of the input device.

20 Claims, 5 Drawing Sheets

METHOD FOR SCANNER CHARACTERIZATION FOR COLOR MEASUREMENT OF PRINTED MEDIA HAVING FOUR OR MORE COLORANTS

CROSS-REFERENCE

The following co-pending application and issued patent, both commonly assigned, are hereby incorporated by reference in their entirety:

U.S. patent application Ser. No. 09/710,106, for "PATCH CODES FOR COLOR CALIBRATION JOB IDENTIFICATION ENCODING", by D. Venable, and R. Bala, filed Nov. 10, 2000; and U.S. Pat. No. 6,335,800B1, for a "METHOD OF MULTIDIMENSIONAL INTERPOLATION FOR COLOR TRANSFORMATIONS," issued Jan. 1, 2002.

FIELD OF THE INVENTION

This invention relates generally to characterizing a digital image scanner for accurate color measurement, and more particularly to a method for use with a standard color scanner so as to enable the scanner to be used as a color measurement device.

BACKGROUND AND SUMMARY OF THE INVENTION

The present invention is directed to a method and apparatus for the improved characterization of a digital image input terminal such as a scanner or digital camera, so as to enable the device to be employed in the measurement and analysis of color images. For the purpose of describing the invention, a scanner will be used as an exemplary device. The invention uses a family of scanner characterization targets, each varying in primary colorants and at a fixed level of black (K) or luminance. A corresponding family of scanner characterizations is derived, one for each level of K, and the transformation are prepared for each value of K, such that the characterization includes K as an input—thereby improving the characterization and accuracy of the scanner. The family of targets may be combined into one physical target; and similarly, the family of scanner characterizations may be combined into a single characterization that accepts 4-dimensional input.

Heretofore, a number of patents and publications have disclosed the measurement of characteristics of color images and color image output devices (image output terminals (IOT)), the following patents and publication are hereby incorporated by reference for their teachings, and the relevant portions of which are briefly summarized as follows:

U.S. Pat. No. 6,529,616, for a "TECHNIQUE FOR ACCURATE COLOR—COLOR REGISTRATION MEASUREMENTS," by Rasmussen, et al., issued Mar. 4, 2003, discloses a test pattern and measurement technique used to allow highly accurate measurements of color-color registration in an image output device that prints in cyan, magenta, yellow, and black. The technique automatically factors out errors originating from skew between the detector and the subject of measurement;

U.S. Pat. No. 6,522,430 directed to "QUANTIFICATION OF MOTION QUALITY EFFECT ON IMAGE QUALITY," by Dalal et al., issued Feb. 18, 2003, teaches a special test pattern and measurement technique used to allow highly accurate measurements of motion quality defects in an image output device that prints in monochrome or color;

U.S. Pat. No. 6,275,600, to Banker et al., for "MEASURING IMAGE CHARACTERISTICS OF OUTPUT FROM A DIGITAL PRINTER," issued Aug. 14, 2001, teaches a method for measuring image characteristics of printed output from a digital printer by sending test pattern data to the digital printer, generating a printed image of the test pattern data at the digital printer, scanning the printed image to obtain digital pattern data, and analyzing the digital pattern data of the printed image. The test pattern that is printed includes target objects designed to reveal specific printed image characteristics, and the analysis of the data from scanning the printed image includes the generation of one or more quantitative ratings with respect to printed image characteristics.

"Refinement of Printer Transformations Using Weighted Regression," by R. Balasubramanian and M. Maltz, SPIE, August 1996, Vol. 2658 (p. 334-340), which is directed to the use of transformations in printer characterization and color correction, and proposes a method for improving the accuracy of such transforms that uses least-squares regression.

Since color scanners and similar image input terminals are commonly available in many imaging environments, it would be of significant benefit if such scanners could be used as color measurement devices for characterizing output devices such as hardcopy printers and the like. Furthermore, because of the high spatial resolution available with most scanners today, they can also be very effective in diagnosing problems with hardcopy devices if they can be accurately characterized to physically measurable color. Examples include scanner-based printer calibration and characterization and printer diagnostics. However, with standard color management, typical scanners provide only mediocre colorimetric accuracy limiting their use in these applications.

Traditional approaches for scanner color management create a characterization profile by scanning a printed target containing color patches. The target is simultaneously measured with a color measurement device to obtain spectral reflectance or colorimetric measurements such as CIELAB. Scanner characterization is the process of relating the scanned (usually RGB) signals to the spectral or colorimetric representation. This process must generally be repeated for each input medium (i.e. combination of substrate, colorants, and image path elements). Thus different scanner color characterization profiles are required for use with a photograph and an electrophotographic print. The primary reason for this is that color scanners are not calorimetric, so that the relationship between the response of the scanner and that of the human eye depends heavily on the spectral properties of the medium being scanned.

For printed media comprising four or more colorants (e.g. cyan, magenta, yellow and black (CMYK)), there is an added dependency on the particular colorant combinations being scanned. The basic subtractive primaries in printing are cyan (C), magenta (M), and yellow (Y). However many marking processes, e.g. lithography, electrophotography, and inkjet, use additional colorants. The most common colorant, and the one used herein to illustrate this invention, is black (K). Other colorant examples include "hi-fidelity" colorants such as orange and green. Whenever four or more colorants are used, there is an inherent redundancy, in that different colorant combinations can result in the same three-dimensional (3-D) response from either the human eye or the scanner. Thus the digital image input terminal or scanner characterization function depends not only on the physical properties of the medium, but also on the particular colorant combinations being scanned. The experiments described by G. Sharma, S. Wang, D. Sidavanahalli, and K. T. Knox, in "The impact of UCR on scanner calibration," in Final Prog. and Proc. IS&T's PICS Conference, Portland, Oreg., 17-20 May 1998, pp. 121-124, illustrate this fact by demonstrating that the scanner characterization, even for a single printer, shows significant variation with the chosen undercolor removal (UCR) and gray component replacement (GCR) strategy.

Standard approaches to scanner characterization make fixed, a priori assumptions about the colorant combinations. Take as an example, the standard Kodak® Q60 lithographic target generated with CMYK combinations. The latter are formed via a predetermined UCR/GCR strategy (designed to suit a typical offset lithographic press), which constrains the amount of black (K) used with a given CMY combination. This approach is justified by the assumption that the lithographic pictorial images that one expects to scan in the final application are also subject to the same or similar UCR/GCR constraints.

A problem arises, however, when CMYK images are encountered that deviate from the assumed UCR/GCR strategy. A typical example would be in a print diagnostics application, where the images that are scanned are not pictorial images, rather they are test patterns designed for diagnosing print defects. In order to obtain visually relevant metrics for the defects, the scanned images are processed through a device characterization mapping RGB color space to CIELAB color space. However, the CMYK used to create the test prints are not necessarily subject to the UCR/GCR constraints normally used for pictorial images. For example, in order to test defects in the K channel, it may be necessary to scan a target containing a large patch of 50% K. Examining an interaction between C and K may require a test pattern of 50% C and 50% K. Typical UCR/GCR strategies optimized for pictures do not account accurately for such colorant combinations. Thus the use of a scanner characterization optimized for a fixed UCR/GCR strategy may give erroneous results. Sharma et al., as noted above, report that significant errors can arise from incorrect assumptions of UCR/GCR in scanner characterization. Many of the larger errors occur in the dark region (which is not surprising since this is where K is usually heavily involved). For the print diagnostic application, such errors may be unacceptable.

Another application where it may be desirable to use the scanner as a color measurement device is printer calibration and characterization. Printer calibration and characterization involves printing and measuring targets comprising patches of various (preferably unconstrained) CMYK combinations, and modeling the printer's response throughout its gamut. In this application one cannot generally assume that the target being scanned has been generated with a fixed UCR/GCR strategy.

Take gray-balance calibration as a specific example. Such a calibration involves searching various CMY combinations in the vicinity of the device neutral (C=M=Y) axis from 0% to almost 100% area coverage, and finding those combinations that match a certain aim (e.g. $a^*=b^*=0$; or $a^*$ and $b^*$ values that match those of the K channel). Purely three-colorant neutrals are not encountered in typical UCR/GCR strategies, as these usually introduce K for the darker grays. As a second example, calibration of the K channel requires measurement of pure K patches from 0% to 100% area coverage. Again these are not encountered in standard UCR/GCR strategies. Thus a standard scanner characterization designed for capturing pictorial images generated with a standard UCR/GCR, would not be "trained" to accurately measure such patches. Similar examples apply for printer characterization.

To effectively use a digital image input terminal as a color measurement device for printer calibration, characterization or diagnostics applications thus requires a device characterization that can accurately describe the printed color regardless of the underlying colorant combination. The invention disclosed herein is directed to a method to achieve device (e.g., scanner) characterization meeting these requirements. The present invention is, therefore, directed at a novel device characterization system and methodology for applications requiring color measurement of printed hardcopy output in diagnostic and calibration and characterization applications. The invention overcomes the limitation of standard scanner color characterization techniques and greatly improves the accuracy in these specialized applications. It is therefore a significant enabler for use of scanners and other image input terminals as color measurement devices in these applications.

In accordance with the present invention, there is provided a method for characterizing a digital image input terminal for color measurement of printed hardcopy, comprising the steps of: printing, for each of a plurality of levels of K, a target comprising a grid of patches having varying levels of C, M, and Y; measuring the colors of patches in said grid of patches in a first color space; scanning the grid of patches on the digital image input terminal to generate a representation of the patches in an input device dependent color space; and deriving, for each of a plurality of levels of K, a characterization transform mapping the scanned device dependent color space values to the first color space.

In accordance with another aspect of the present invention, there is provided a method of performing color image rendering quality analysis on an image output device having an output station that generates a hardcopy color image output from an input image, the method comprising: characterizing an image input terminal, such as a scanner, for color measurement of printed hardcopy, including printing, for each of a plurality of levels of K, a target comprising a grid of patches having varying levels of C, M, and Y, measuring the color of the patches in the grid in a first color space, scanning the patches on a digital image input terminal to generate a representation of the patches in input device color space, and deriving, for each level of K, a scanner characterization transform mapping the scanned input device color space values (e.g., RGB) to the first color space; generating a hardcopy image output from the image output device using a digital test pattern as an input, said digital test pattern including a plurality of color patches, and associated black-only patches representing the value of K for the color patches; scanning the hardcopy image output from the image output device with the scanner to form a digital image; performing a color space transformation for at least one of the plurality of colors on the hardcopy image output from the image output device to produce a color space value for the patch in the first color space; and performing a quality analysis on the hardcopy output based on a comparison of the accurately characterized color patch in the first color space in relation to an intended color for that patch.

In accordance with yet another aspect of the present invention, there is provided a system for performing color image quality analysis on an image output device having an output station that generates a hardcopy color image output in response to an input image, comprising: a test target comprising a grid of patches having varying levels of C, M, and Y at a plurality of levels of K; a scanning system including a processor, memory and scanner in communication with the processor and memory, wherein the scanner is characterized for color measurement of printed hardcopy by scanning the patches on the test target to generate a representation of the patches in RGB color space, and in conjunction with measured color data for the test target patches, in a first color space, a scanner characterization transform is generated and stored in the memory as a mapping from the device dependent color space to the first color space; a hardcopy image, generated from the image output device in response to a digital test pattern input, said digital test pattern including a plurality of color patches and associated black-only patches representing the value of K for the color patches, wherein the hardcopy image is scanned with the scanning system to produce digital image data, and the digital image data for at least one of the color patches is transformed, by the scanning system, to produce a color space value for the patch in the first color space; and means for performing a quality analysis on the hardcopy output based on a comparison of the accurately characterized color patch in the first color space in relation to an intended color for that patch as specified by the digital test pattern.

One aspect of the invention deals with a basic problem in the use of digital image input terminals for colorimetric or similar image analysis functions—characterization of the scanner. This aspect is further based on the discovery of a technique that alleviates this problem. The technique uses a family of device characterization targets, each varying in primary colorants and at a fixed level of black (K) or luminance. A corresponding family of device characterizations is derived, one for each level of K, and the transformation are prepared for each value of K, such that the characterization includes K as an input—thereby improving the characterization and accuracy of the input device. As a result of the invention, conventional image input terminals such as scanners may be employed to more accurately measure and analyze output from hardcopy image output devices.

Figure 1:
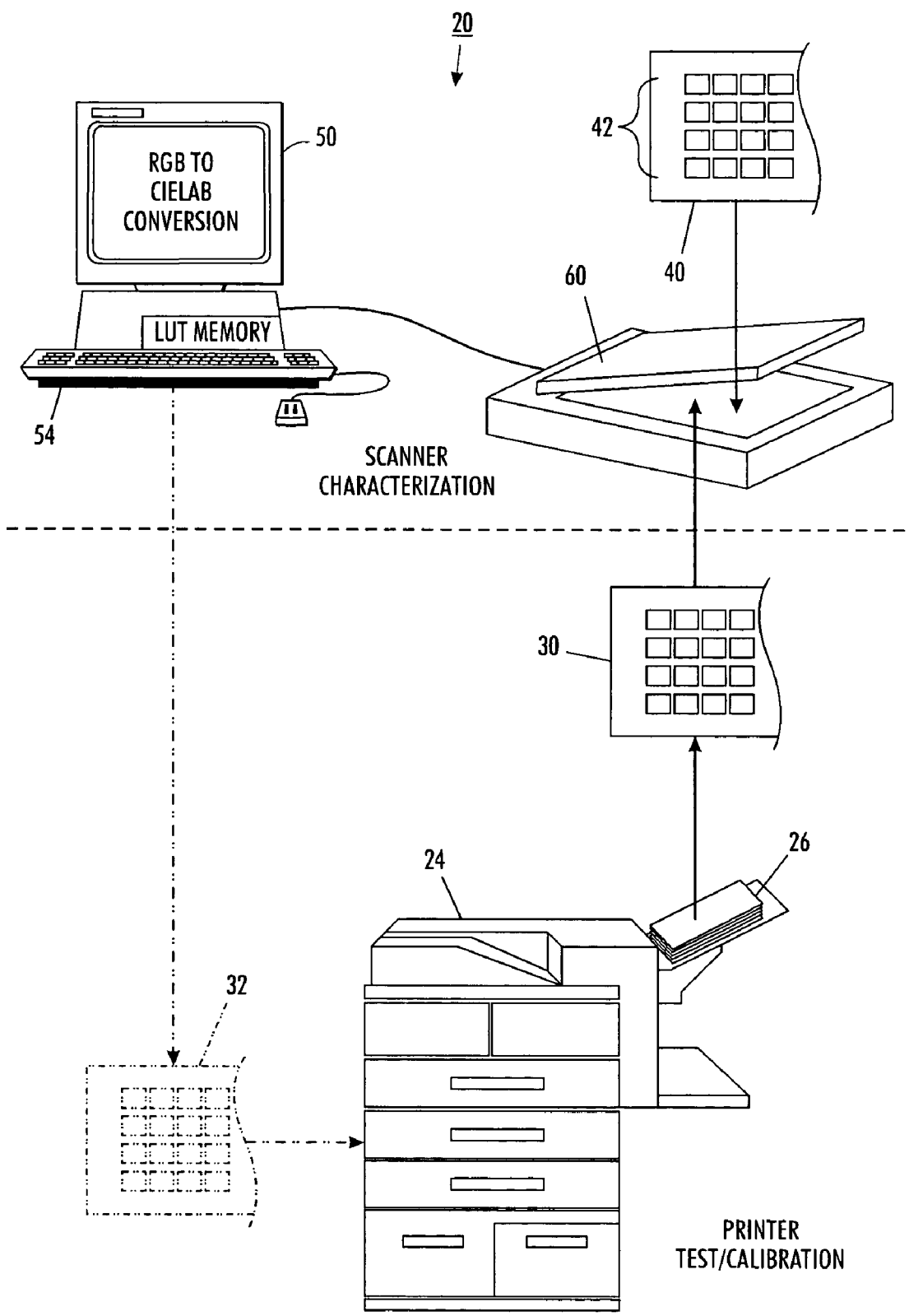
FIG. 1 is a block diagram illustrating a general embodiment and application in accordance with the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, reference will be made to various examples using cyan, magenta, yellow and black (CMYK) colorants to describe the invention. Generalization to other additional colorants is straightforward, however, and the use of particular examples using CMYK is not intended to limit the scope of the invention. In describing the present invention, the following term(s) have been used in the description.

The term "calibration" refers to 1-D tone reproduction curves that bring the device to a known state; while "characterization" refers to the multidimensional transform that relates device-dependent to device-independent color.

An item of data "defines" an image when the item of data includes sufficient information to produce the image. For example, a two-dimensional array can define all or any part of an image, with each item of data in the array providing a value indicating the color of a respective location of the image.

An "image input terminal" (IIT) is a device that can receive an image and provide an item of data defining a version of the image. A "scanner" is an image input device that receives an image by a scanning operation, for example, by illuminating a document and recording the level or intensity of various colors of light reflected from the surface of the document. Similarly, a digital camera or other forms of digital image capture arrays are image input terminals or devices.

An "image output terminal" (IOT) is a device that can receive an item of data defining an image and provide the image as output. Printers and displays are image output devices that provide an output image in human viewable form. The visible pattern presented by a display is a "displayed image" or simply "image."

Referring first to FIG. 1, there is illustrated an exemplary embodiment and application for aspects of the present invention. System 20 comprising an IIT and supporting software and hardware, is adapted to perform color image quality analysis or color calibration or characterization for an image output terminal (e.g., printer 24) having an output station 26 that generates a hardcopy color image output 30 in response to an input image such as a digital test pattern 32. Prior to the color image quality analysis or color calibration or characterization of the IOT, system 20 must itself be characterized so that the device signals recorded by the IIT are mapped to a standard, preferably device independent color representation. To this end, in system 20, a test target 40, includes a grid 42 of patches having varying levels of cyan (C), magenta (M), and yellow (Y) at a plurality of levels of luminance or black (K). The scanning system further includes a processor 50 having memory 54 (including look-up tables (LUT)) and a scanner 60 in communication with the processor and memory. In one embodiment, the scanner is characterized for color measurement of printed hardcopy by scanning the patches on the test target 40 to generate and store, for each level of K, a representation of the patches in RGB color space, and in conjunction with measured color data for the test target patches, in a first color space (e.g., CIELAB), a scanner characterization transform is generated and stored in the memory as LUT(s) for mapping from the RGB color space and the given level of K to the first color space.

It will be appreciated that aspects of the present invention and various empirical data as set forth below may be generated and/or processed using a computer or processor. However, the present invention is not intended to be limited in any way to the computing platform or processing methods described herein.

In one application of the present invention, a hardcopy image 30, is generated from the image output device 24 in response to a digital test pattern 32 input thereto from processor 50, or from an alternative source (e.g., network, disk, etc.). The digital test pattern includes a plurality of color patches and associated black-only patches representing the luminance or K value of the color patches. For printer test/calibration, the hardcopy output image 30 is scanned with the scanning system to produce digital image data, and the digital image data, in conjunction with the corresponding K value for at least one of the color patches is transformed, by the scanning system, to produce a color space value for the patch in the first color space. In a print quality or diagnostics application, this value may then be compared to the intended color for the patch. Such a comparison may be carried out by one of several processors providing means for performing the quality analysis. For example, the analysis may be carried out by processor 50, by a networked printer controller resident within printer 24 or remote, or by other networked or peripheral computing resources capable of executing the comparison. In a general form, the data generated by the characterized scanner, in response to one or more patches on the hardcopy output, is compared with an intended color for that patch as specified by the digital test pattern. The resulting comparison identifies whether the hardcopy output is within acceptable range of the intended color, or if out of range, the deviation is specified (color, luminance).

In a printer calibration or characterization application, values in the first color space for each patch are related to the digital CMYK values used to create the patch. This relationship is used to derive the printer calibration or characterization functions.

Hence, FIG. 1 illustrates a scanner characterization technique for applications requiring color measurement of printed hardcopy output in diagnostic and calibration applications. The technique, as will be further described below, overcomes the limitation of standard scanner color characterization techniques and greatly improves the accuracy in such specialized applications. It is therefore a significant enabler for the use of scanners as color measurement devices in such applications.

Since the spectral reflectance of a CMYK print depends on four independent parameters, it is logical to expect that the scanner characterization is also a function of four (rather than three) variables. In the present invention, this dependence is explicitly recognized by introducing a fourth input dimension in addition to the usual scanner dimensions of red (R), green (G), and blue (B). The additional dimension is related to the amount of black (K) present in the print.

In one embodiment, a family of scanner characterizations is derived, each for a fixed digital level of K. This is accomplished by printing, for each level of K, a target such as target 40 in FIG. 1, comprising a grid with color patches varying in C, M, and Y. The patches are measured as well as scanned. We will assume henceforth that the measurements are in CIELAB coordinates, and scanned values are in RGB coordinates. Various standard techniques such as neural network or polynomial regression (e.g., as described by R. Bala, in "Device Characterization", Chapter 5 of Digital Color Imaging Handbook, CRC Press, 2003, hereby incorporated by reference in its entirety) can be used to derive a scanner characterization transform mapping scan RGB to CIELAB. In order to afford efficient processing of image data through the characterization transform, the latter is usually implemented as a multi-dimensional (e.g., 3-D) lookup table (LUT) mapping the scanned RGB to CIELAB.

Figure 2:
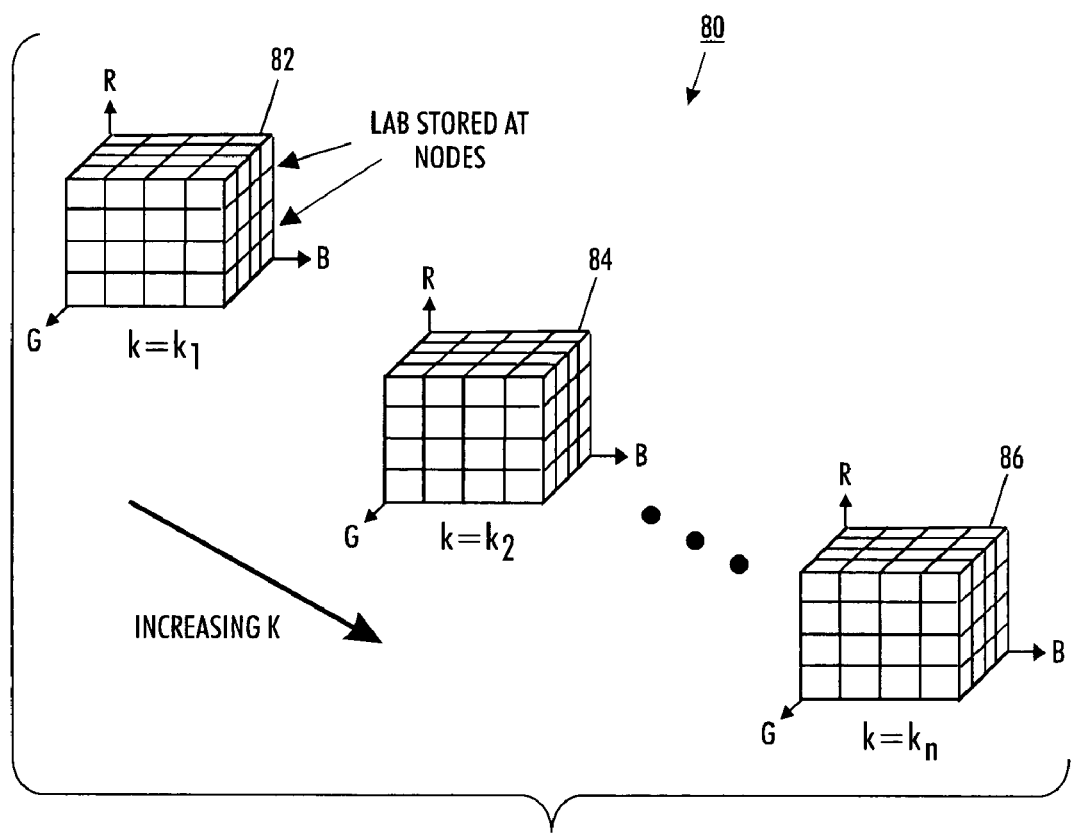
FIG. 2 illustrates a family of device characterization LUTs mapping scanned RGB to CIELAB for different levels of K in accordance with an embodiment of the present invention.

As illustrated in FIG. 2, the resulting transform mapping is therefore a family or plurality of 3-D LUTs 80, each table 82, 84 and 86, corresponding to a fixed level of K (e.g., $k_1$, $k_2$, $k_n$). Based upon the transforms then, a scanned RGB value having a K=$k_2$, for example, would be indexed into LUT 84, and the particular LAB value for the scanned RGB would be stored at the location indexed by the R, G and B values.

The K levels can be selected based on knowledge of the test images that are likely to be scanned. In an application where the entire scanned image corresponds to a fixed level of K (as is possible with diagnostic targets), the 3-D LUT corresponding to the most similar K value is retrieved, and the image processed through the LUT to obtain the CIELAB representation.

Figure 3:
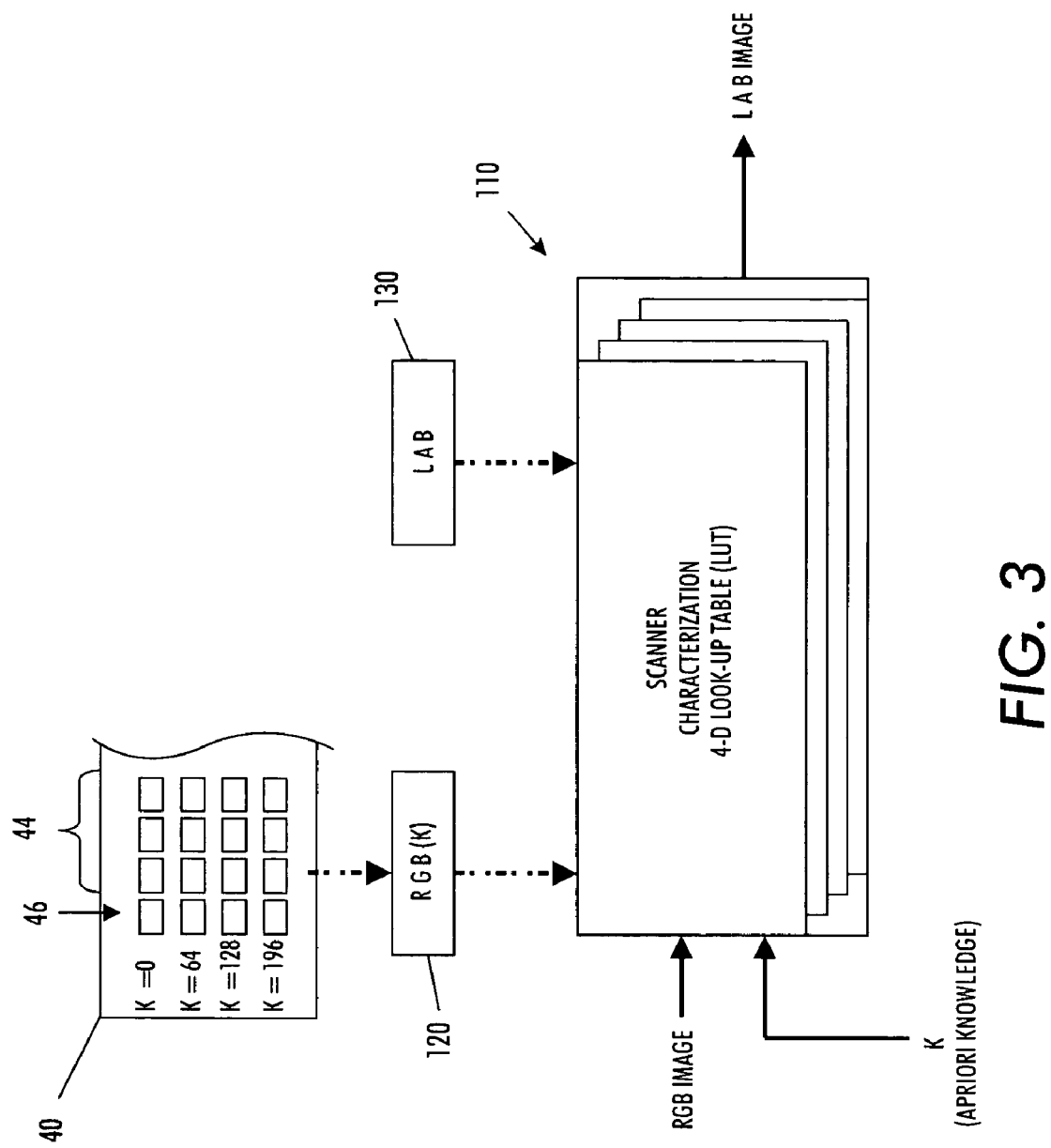
FIGS. 3 and 4 are detailed block diagrams of components and procedures used in the various embodiments of the present invention.
Figure 4:
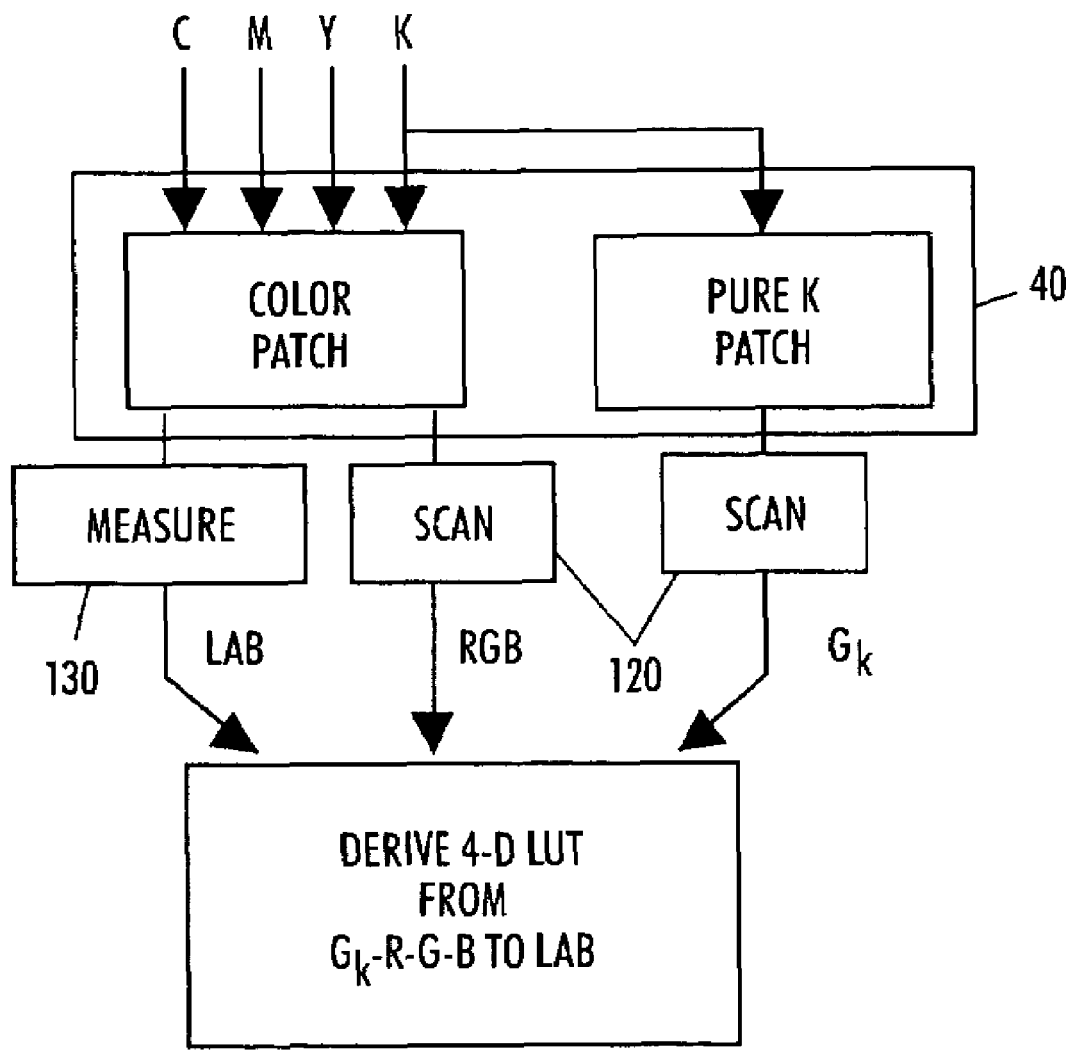

In an alternative embodiment, represented in FIGS. 3 and 4, the family of 3-D LUTs 80 (FIG. 2) are combined into a single 4-D LUT 110 mapping KRGB to CIELAB. This allows determination of the scanner characterization transform for arbitrary levels of K in the image via interpolation among the pre-characterized K levels. Referring to FIGS. 3 and 4, it will be appreciated that once properly characterized (using as inputs the scanned RGB and K data (120), and the measured CIALAB data (130)), the 4-D LUT 110 associated with a scanner 60 or system 20 may be employed to provide accurate measurement of calorimetric levels for various images, test patterns and the like.

Thus far the fourth dimension in the scanner characterization is the digital K value used to generate the printed color. One limitation with this approach is that one has to know or separately keep track of the digital K values both for the scanner characterization step, as well as for the final prints being analyzed. A second more important limitation is that the relationship between digital K and actual printed K can vary from device to device and over time, thus potentially reducing the accuracy of the scanner characterization.

To overcome these limitations, it is possible to estimate the actual printed K, rather than the digital K, value as the fourth dimension in the scanner characterization. To this end, another embodiment of this invention uses the scanner's green (G) channel response to pure K print patches as the fourth dimension in the scanner characterization LUT. We denote this fourth dimension as $G_k$. Recall that the scanner characterization target is a family of CMY patches laid out in a grid for varying K. In one embodiment of the test target 40, as depicted in FIG. 3, the first patch in each row of the grid (see grid column 46) is designated as the pure K patch (i.e. C=M=Y=0). The scanner's green response to this patch is then used to index into the respective 3-D characterization from scanned RGB to CIELAB. The final transform is a 4-D LUT mapping $G_k$RGB to LAB. The process for deriving this transform is summarized in FIG. 4.

Figure 5:
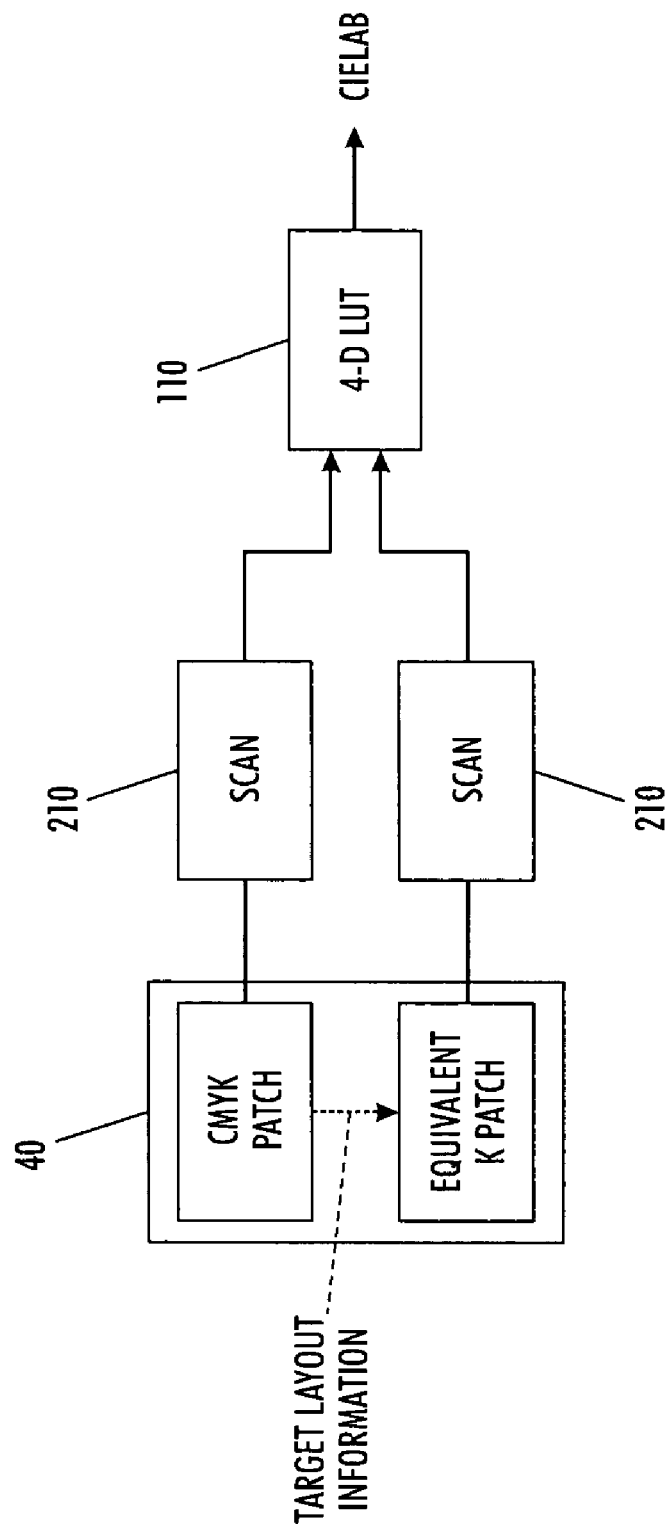
FIG. 5 is an illustrative block diagram representing the procedure carried out in accordance with the application of the invention set forth in FIG. 1.

Referring now to FIG. 5, there is depicted a schematic block diagram depicting an application of the present invention, where a test target 40 (e.g. printer diagnostic or calibration target) is placed in a scanner and scanned 210, and the scanned RGB values and the associated K ($G_k$) are provided as an index into a 4-D LUT 110 (e.g., as stored in memory 54 of FIG. 1). The output of this LUT 110 is a CIELAB representation of the scanned image. There are several methods of obtaining the K amount associated with each scanned RGB pixel.

i) In the simplest instantiation, the user can manually supply the K value(s) to the system. This would be a reasonable approach if the entire image was generated with a single fixed level of K.

ii) The amount of K in the image could be automatically estimated from the RGB scan by examining the color and spatial structure of the K halftone dots.

iii) In the embodiment that uses scanned $G_k$ instead of digital K, the final target being scanned must be specially designed so that every CMYK patch has an associated or corresponding patch with the same amount of K, and C=M=Y=0, referred to as the pure K patch. The software that parses the scanned RGB file must, therefore, retrieve for each CMYK patch the corresponding pure K patch on the target. The scans for these two associated patches are then fed into the 4-D characterization LUT to obtain the CIELAB representation, for example, as shown in FIG. 5.

Two points are noteworthy with respect to approach (iii) above. First, the correspondence between a CMYK patch and the equivalent pure K patch can be established with an intentionally designed target layout. For example, the target could be designed as illustrated in FIG. 3, where each row or column of color patches is made of the same K value, with the first patch in the row or column being made of pure K. It will be appreciated that similar layout and pattern selection rules can be conceived.

Alternatively one can automatically encode the correspondence (relationship between the CMY and K-only patches) into the target with the use of identification devices, bar codes, or patch codes as described by the inventor in U.S. patent application Ser. No. 09/710,106 for "PATCH CODES FOR COLOR CALIBRATION JOB IDENTIFICATION ENCODING", by D. Venable, and R. Bala, previously incorporated herein by reference in its entirety. When the scanner scans the target, the patch codes are decoded and the correspondences automatically established. A secondary benefit to using patch codes is that drastic changes in the state of the printer or scanner can be readily detected and flagged to the user at the very start of the characterization process.

The second point relative to approach (iii) is that since the fourth dimension to the scanner characterization is a scanned attribute of actual printed K rather than input digital K value, the technique of approach (iii) calibrates out the effect of variations in printed K over time and across devices. As a result, a single scanner characterization derived from a target generated by one printer at one given time enables the scanner to be used as an accurate color measurement for multiple printers (preferably within the same family) over a considerable period of time. This makes the invention a powerful technique for fleet calibration and characterization applications.

Having described several embodiments, applications and variations of the present invention, attention is now turned to some empirical results obtained from an embodiment of the invention. In the following discussion of experimental results, the simulations were carried out with a Xerox® Phaser® 7700 CMYK laser printer and a Umax™ color scanner. In order to minimize quantization artifacts, the scans were obtained at 10 bits/channel/pixel. The following approaches were compared:

Standard Approach 1: A standard IT8.7/2 scanner target comprising 288 patches was printed on the Phaser 7700 with a fixed nominal UCR/GCR strategy. This target was measured to obtain CIELAB values, and scanned on the Umax to obtain scan RGB values. The latter was used to build a 3-D LUT mapping scan RGB to CIELAB. The LUT size was 16×16×16.

Standard Approach 2: Five targets, were printed, each made up of a 6×6×6 CMY grid and constant levels of K=0, 64, 128, 192, 255 respectively. The grid sampling along each of the C, M, and Y dimensions was uniform in digital counts. All the patches were scanned as well as measured, and the entire set of RGB and LAB values were used to build a 3-D LUT mapping scan RGB to CIELAB. The LUT size was 16×16×16.

Proposed Approach: The data from Standard Approach 2 was used to build five different 3-D LUTs from scanned RGB to CIELAB, each LUT corresponding to a different value of K. The scanner's green response $G_k$ to each of the five pure K patches was extracted to obtain the fourth scanner dimension. The five 3-D LUTs were then combined into a single 4-D LUT mapping scanned $G_k$RGB to CIELAB. The LUT size was 5×16×16×16.

In all cases, the 3-D LUTs were built using moving-matrix fitting as described by the inventor in "Refinement of printer transformations using weighted regression," Proc. SPIE, Vol 2658, pp. 334-340, (1996), the teachings of which are hereby incorporated by reference in their entirety. To test these approaches an independent target of 336 CMYK patches was printed, measured and scanned. For both the standard approaches, the scanned RGB values were mapped through the respective 3-D LUTs to obtain CIELAB values. The $\Delta E^*ab$ color difference between these and the measured CIELAB values was then computed. For the proposed approach, the scanned RGB values in combination with the scanner's green response $G_k$ to pure K were mapped through the 4-D LUT to obtain CIELAB values. These were compared with the true measured values using the $\Delta E^*ab$ metric. For the simulation, $G_k$ was estimated by mapping the input digital K values through a tone reproduction curve (TRC) derived from scans of pure K samples. (The latter were part of the 336 patches.)

Table A (below) summarizes the results of the approaches set forth above. The first row presents errors for the entire data set of 336 patches. The errors produced by the first standard technique are unacceptable for many applications (including printer characterization and diagnostics). The second standard approach offers some improvement as it uses a larger training set with unconstrained CMYK combinations. However, the characterization still uses only a 3-D LUT. The proposed technique offers further improvement as it uses a 4-D characterization transform, thus allowing the dependence on the fourth dimension (K) to be explicitly captured.

TABLE A

| | $\Delta E^*_{76}$ errors (Average/95th percentile) | | |
|---|---|---|---|
| | Standard Approach 1 | Standard Approach 2 | New Approach |
| Entire 336 data set | 4.0/10.4 | 3.2/7.1 | 2.2/5.6 |
| Pure K (C = M = Y = 0) subset | 7.7/12.3 | 4.7/8.0 | 1.6/3.0 |
| C = M = Y (K = 0) subset | 3.4/6.6 | 4.8/8.7 | 2.1/5.9 |

Note that a fraction of these patches lie along the "upper" surfaces of the gamut for which UCR/GCR has no effect, and K=0. For these patches, we expect all three techniques to perform comparably. Given this fact, one can deduce that the improvement produced by the proposed technique is even greater in those regions where UCR/GCR has a strong effect. To validate this, the second row of Table A presents results for a subset of 24 patches containing K only (C=M=Y=0). We notice a dramatic improvement with the proposed technique. The third row presents analogous results for a subset of 12 patches with C=M=Y, K=0. Once again, the proposed technique is noticeably more accurate than the standard methods. The results in the second and third rows also demonstrate the value of the present invention in performing printer gray-balance calibration and K linearization using a scanner as a measurement device.

When examining the results in Table A, it is important to keep in mind the other sources of color errors in the system. LUT interpolation errors can typically produce average $\Delta E^*ab$ much greater than 1.0. Another important source of error is page-to-page variation in the printing process. Based upon experience, the page-to-page variation can give rise to average $\Delta E^*ab$ values between 1.0 and 2.5. In light of these underlying system errors, Table A illustrates that the invention achieves excellent accuracy. Finally, it is noted that similar trends were observed when computing the $\Delta E^*94$ metric instead of $\Delta E^*ab$.

The proposed invention could be either bundled with scanner software or implemented as a separate application. The final scanner characterization transform readily fits into the International Color Consortium (ICC) profile architecture, since the latter allows the use of LUTs of arbitrary dimensionality in input device profiles.

As described herein, one embodiment utilizes a scanner characterization target with a grid comprising a family of C×M×Y patches at constant levels of K. It is desirable that the levels along each dimension are chosen to minimize the visual impact of interpolation error in the 4-D LUT. To this end, an initial calibration step can be performed whereby step-wedges of pure C, M, Y, K are scanned, and linearization TRCs are generated. These linearization TRCs can then be used to generate optimal grid spacings for the characterization targets and the final 4-D LUT.

An added cost incurred from the proposed approach is the increase in storage and memory in using a 4-D LUT rather than a 3-D LUT for scanner characterization. Fortunately, there are ways to make the 4-D LUT more compact. Note that as the amount of K increases, colors in a given characterization target become darker and less saturated. Thus both the scanned RGB and measured CIELAB values will exhibit less variation as a function of the underlying C, M and Y. In the extreme case, 100% K overprinted on different C, M and Y combinations produces little color variation. To account for this, both the characterization targets, and the node sampling in the 3-D characterization LUTs can be intelligently designed to depend on K. For small K, the characterization target exhibits significant color variation, calling for a larger grid sampling in the target and a finer node sampling in the LUT. However, as K increases, the color variation decreases, thus requiring smaller targets and coarser/smaller LUTs in FIG. 2. U.S. Pat. No. 6,335,800B1, for a "METHOD OF MULTIDIMENSIONAL INTERPOLATION FOR COLOR TRANSFORMATIONS", previously incorporated herein by reference, teaches a method for multidimensional interpolation based on such variable LUT structures, and demonstrates a significant reduction in LUT size for a given level of accuracy.

As set forth above, aspects of the present invention are particularly applicable to colorimetric scanning of not only CMYK prints, but prints made from any set of special colorants in addition to C, M and Y (e.g. "hi-fi" colorants). The present invention can also be used with other capture devices such as digital cameras. The technique can be readily extended to predicting spectral reflectance (as opposed to calorimetric) information as described by G. Sharma and S. Wang, in "Spectrum Recovery from Colorimetric Data for Color Reproductions," in Proc. SPIE 4663, IS&T/SPIE's Electronic Imaging Symposium, 20-25 Jan. 2002, San Jose, Calif. The only element that changes is the scanner characterization profile, which must now output spectral reflectance data. Finally, the use of extra channels in the scanner in addition to R, G, B can be of value in this invention. These extra channels can be potentially designed to capture the effects of the extra printed colorants, thus directly serving as the additional input dimensions to the scanner transformation.

In recapitulation, there has been described, in accordance with the present invention a method and apparatus for characterizing a scanner for color measurement of printed hardcopy. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for characterizing a digital image input terminal for color measurement of printed hardcopy, comprising the steps of:

printing, for each of a plurality of levels of K, a target comprising a grid of patches having varying levels of C, M, and Y;

measuring the colors of patches in said grid of patches in a first color space;

scanning the grid of patches on the digital image input terminal to generate a representation of the patches in an input device dependent color space; and deriving, for each of a plurality of levels of K, a characterization transform mapping the scanned device dependent color space values to the first color space.

2. The method of claim 1 where the digital image input terminal is a hardcopy scanner.

3. The method of claim 1 wherein the grid of patches printed for each of the plurality of levels of K are combined into a single physical target for printing.

4. The method of claim 1 wherein the characterization transforms derived for each of the plurality of levels of K are combined into a single characterization transform that accepts a K level as an additional input.

5. The method of claim 1, wherein said characterization transform is accomplished by deriving at least one look-up table to carry out the transform.

6. The method of claim 5, wherein the characterization transform step is accomplished using polynomial regression.

7. The method of claim 1, wherein the first color space is CIELAB.

8. The method of claim 1 where the device dependent color space is an RGB space.

9. The method of claim 1, wherein said scanner characterization transform is accomplished by deriving a plurality of 3-D look-up tables to carry out the transform.

10. The method of claim 1 wherein said characterization transform is accomplished by deriving a single multidimensional look-up table to carry out the transform.

11. The method of claim 1, further comprising the steps of:

including for each of the plurality of levels of K, a patch comprising a pure K output, with C, M, and Y equal to zero;

scanning the pure K patch and recording the response of the digital image input terminal to the pure K patch; and producing a final transform as a multidimensional look-up table for mapping the device dependent color space values, in conjunction with the response of the digital image input terminal to the pure K patch, to the first color space.

12. The method of claim 11, wherein the digital image input terminal produces R, G, B signals, and where the response to the pure K patch is the green signal, denoted $G_k$, such that the multidimensional look-up table receives, as inputs, R, G, B, $G_k$.

13. The method of claim 11, further comprising the steps of:
  rendering a test target from an image output terminal;
  scanning the test target using the digital image input terminal and generating response signals for color patches on said test target;
  applying the response signals, along with a function of the K level of the patch color, to the 4-D look-up table to obtain a first color space representation of the patch color.

14. The method of claim 13, wherein the function of the K level is manually input.

15. The method of claim 13, wherein the function of the K level is automatically estimated from the response signals produced by the digital image input terminal.

16. The method of claim 13, wherein the function of the K level is determined by scanning, on the test target, a patch having a K level equal to that of the color patch, but rendered only using K, where C, M and Y are equal to zero; and where the function of the K level is then set to be equivalent to the response for at least one of the response signals when the K level patch was scanned.

17. A method of performing color image rendering quality analysis on an image output device having an output station that generates a hardcopy color image output from an input image, the method comprising:
  characterizing a scanner for color measurement of printed hardcopy, including
    printing, for each of a plurality of levels of K, a target comprising a grid of patches having varying levels of C, M, and Y,
    measuring the color of the patches in the grid in a first color space,
    scanning the patches on a digital image input terminal to generate a representation of the patches in RGB color space, and
    deriving, for each grid of patches, a scanner characterization transform mapping the scanned RGB color space values to the first color space;
  generating a hardcopy image output from the image output device using a digital test pattern of known CMYK as an input;
  scanning the hardcopy image output from the image output device with the scanner to form a digital image;
  performing a color space transformation for at least one of the plurality of colors on the hardcopy image output from the image output device to produce a color space value for the patch in the first color space; and
  performing a quality analysis on the hardcopy output based on a comparison of the accurately characterized color patch in the first color space in relation to an intended color for that patch.

18. A system for performing color image quality analysis on an image output device having an output station that generates a hardcopy color image output in response to an input image, comprising:
  a test target comprising a grid of patches having varying levels of C, M, and Y at a plurality of levels of K;
  a scanning system including a processor, memory and a scanner in communication with the processor and memory, wherein the scanner is characterized for color measurement of printed hardcopy by scanning the patches on the test target to generate a representation of the patches in RGB color space, and in conjunction with measured color data for the test target patches, in a first color space, a scanner characterization transform is generated and stored in the memory as a mapping from the RGB color space to the first color space;
  a hardcopy image, generated from the image output device in response to a digital test pattern input, said digital test pattern including a plurality of color patches and associated black-only patches representing the value of K for the color patches, wherein the hardcopy image is scanned with the scanning system to produce digital image data, and the digital image data for at least one of the color patches is transformed, by the scanning system, to produce a color space value for the patch in the first color space; and
  means for performing a quality analysis on the hardcopy output based on a comparison of the accurately characterized color patch in the first color space in relation to an intended color for that patch as specified by the digital test pattern.

19. A method for characterizing a digital image input terminal for color measurement of printed hardcopy generated from C, M, Y, and at least one extra colorant, comprising the steps of:
  printing, for each of a plurality of levels of at least one of the extra colorants, a target comprising a grid of patches having varying levels of C, M, and Y;
  measuring the color of the patches in the grid in a first color space;
  scanning the patches in the grid on the digital image input terminal to generate a representation of the patches in the input device dependent color space; and
  deriving, at each level of the at least one extra colorant, a characterization transform mapping the scanned device dependent color space values to the first color space.

20. The method of claim 19 wherein the characterization transforms for the plurality of levels of the at least one extra colorant are combined into a single characterization transform that accepts a signal representing the extra colorant as an additional input.

* * * * *